Figure 1:
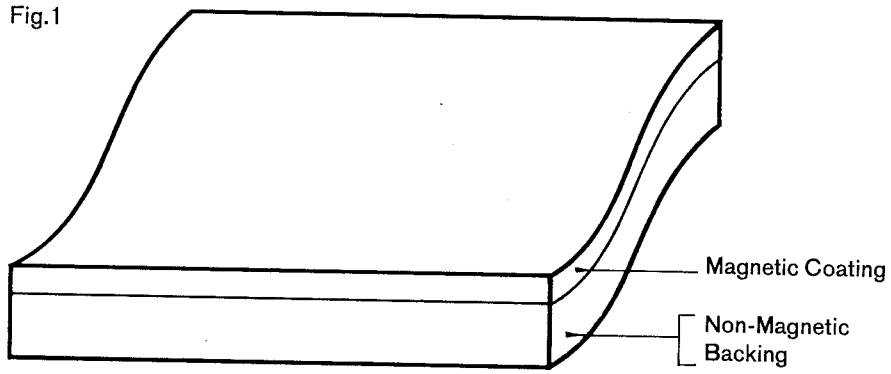

Sept. 7, 1965                M. ROSENBERG                3,205,092
             MAGNETIC TAPE HAVING IMPROVED ANTISTATIC PROPERTIES
                            Filed Feb. 20, 1962

Magnetic Coating

Non-Magnetic Backing

Magnetic Coating: containing Binder Antistatic Agent, $Fe_2O_3$

Non-Magnetic Backing

Inventor
Milton Rosenberg by  E. H. Valance
Agent

K. F. Jorda
Attorney

United States Patent Office 3,205,092
Patented Sept. 7, 1965

3,205,092
MAGNETIC TAPE HAVING IMPROVED
ANTISTATIC PROPERTIES
Milton Rosenberg, Yonkers, N.Y., assignor to Geigy
Chemical Corporation, Greenburgh, N.Y., a corporation
of Delaware
Filed Feb. 20, 1962, Ser. No. 174,511
7 Claims. (Cl. 117—138.8)

This invention relates to a process for improving antistatic properties of magnetic tape and to new compositions suitable for coating the tape as well as improved magnetic tape suitable for use in sound recording, computers, etc.

In particular, the invention relates to the use of an antistatic agent formed by reacting an organic base of the Formula I:

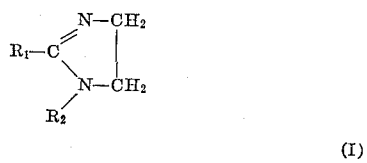

(I)

wherein $R_1$ is an alkyl group preferably, an alkyl group having from 7 to 17 carbon atoms, or an alkenyl group preferably an alkenyl group having at least 1 double bond and from 7 to 17 carbon atoms; the most preferred groups being alkyl having 11 carbon atoms, and $R_2$ is hydroxyalkyl, especially hydroxy(lower)alkyl, e.g. hydroxymethyl, hydroxyethyl, hydroxypropyl, hydroxybutyl, hydroxypentyl, hydroxyhexl, preferably hydroxyethyl, with at least one of either a dibasic organic acid or a hydroxy organic acid having at least one free carboxy group. Mixtures of salts may be usefully employed. Thus the salts of adipic, sebacic, isophthalic, tartaric, and mercaptosuccinic acid may be used. The preferred acids are adipic acid and sebacic acid. Acid salts as well as neutral salts are within the scope of the invention for use as antistatic agents. Particularly valuable salts for antistatic purposes are di(1-β-hydroxyethyl-2-undecylimidazoline) adipate, di(1-β-hydroxyethyl-2-undecylimidazoline) sebacate, di(1-β-hydroxyethyl-2-undecylimidazoline) isophthalate, di(1-β-hydroxyethyl-2-undecylimidazoline) tartrate, and di(1-β-hydroxyethyl-2-undecylimidazoline) mercaptosuccinate. The especially preferred antistatic agent for use in magnetic tape is di(1-β-hydroxyethyl-2-undecylimidazoline) adipate.

The antistatic agents useful according to the invention are prepared by reacting the free base of an imidazoline with a suitable acid. For example, 69 parts of 1-β-hydroxyethyl-2-undecylimidazoline in a molten state may be added to a mixture of 18.25 parts adipic acid in 87.25 parts of a 50% by weight aqueous isopropanol solution and the resultant mixture heated at 60° with gentle stirring for 5 minutes. For another 5 minutes the resultant mixture may be heated at 69° and thereafter the amber liquid reaction mixture allowed to cool to room temperature. In a similar fashion, other useful antistatic agents are formed according to the proportions set forth in the following table.

TABLE I
Formation of anti-static agents by reacting an organic acid with an imidazoline compound

| Reactants, parts by weight | | | | Salt |
|---|---|---|---|---|
| Organic acid | | 1-β-hydroxy-ethyl imidazoline | | |
| Adipic | 18.25 | 2-undecyl | 69 | Di(1-β-hydroxyethyl-2-undecyl-imidazoline) adipate. |
| Sebacic | 25.28 | 2-undecyl | 69 | Di(1-β-hydroxyethyl-2-undecyl-imidazoline) sebacate. |
| Isophthalic | 20.8 | 2-undecyl | 69 | Di(1-β-hydroxyethyl-2-undecyl-imidazoline) isophthalate. |
| Tartaric | 12.3 | 2-undecyl | 69 | Di(1-β-hydroxyethyl-2-undecyl-imidazoline) tartrate. |
| Mercaptosuccinic | 15.0 | 2-undecyl | 50 | Di(1-β-hydroxyethyl-2-undecyl-imidazoline) mercaptosuccinate. |

It is an object of the present invention to utilize the foregoing described antistatic agents in the process of making magnetic tape suitable for use in computers, sound recording, etc. It is a further object of the invention to provide magnetic tape suitably protected against accumulation of static charge.

Magnetic tape for sound recording, as well as for other purposes, e.g. use in computers, video tape, etc., usually runs at very high speeds through the devices in which said tape is being used. As a result of the motion of the tape against the guide posts or other parts of the devices in which it is used, static electrical charges accumulate on the tape. Any antistatic agent which would be incorporated into such tapes must be able to dissipate the charges very rapidly. This is especially true where such tapes are used at relatively high speeds. The antistatic agents of the invention are able to dissipate surface charges from magnetic tape readily and rapidly, and therefore they are especially valuable for incorporation into either the coating of the tape in which the magnetic iron oxide is found or for incorporation into the plastic backing upon which said coating is placed.

Magnetic tapes are manufactured by coating a plastic ribbon with a suspension of iron oxide in a solvent mixture and evaporating off the solvent. The solvent usually contains binding agents and other materials to produce a uniform film and to help adhesion to the ribbon. Other additive materials may also be present in this mixture which is used for coating the tape and fixing the magnetic material to the plastic backing. The disadvantage of static electrical charges being built up on the tape is especially in the impairment of the efficiency of the tape. Present methods of overcoming build-up of static electrical charge on such magnetic tape include the use of conductive carbon black in the coating. The disadvantage of this use of conductive carbon black is the fact that the content of iron oxide in the coating usually has to be reduced in order to maintain the solids in the coating at the desirable level. Thus, according to present methods, magnetic strength or response of such tape is inferior to a tape containing the maximum of iron oxide.

It has now surprisingly been found that the antistatic agents of the invention and especially di(1-β-hydroxyethyl-2-undecylimidazoline) adipate, are especially valuable for dissipating static charge on magnetic tape and at the same time permitting the maximum amount of iron oxide to be present in the coating of said tape so that the optimum in magnetic strength or response of the tape is attained.

Reference may be made to the accompanying drawing for a pictorial representation of tape made in accordance with the invention.

Figure 2:
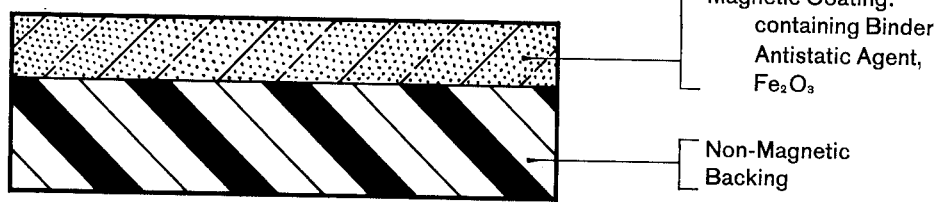

FIG. 1 is a diagrammatic perspective view of an enlarged piece of magnetic recording tape, which may be considered as coming from a roll of same; and FIG. 2 is a cross-section view of part of the same piece of tape, in an even more enlarged form, illustrative of the practice of the invention.

Referring to the first figure, it shows a non-magnetic backing or base, such as plastic e.g. Mylar terephthalic anhydride glycol derivative, and a magnetic coating on one side thereof. The second figure bears legends showing the non-magnetic backing as well as the magnetic coating. The latter also bears legends pointing to the presence in the coating of magnetic iron oxide ($Fe_2O_3$), also the antistatic agent and finally, the binder. The antistatic agent may be any of the specific antistatic compounds enumerated above, but di(1-β-hydroxyethyl-2-undecylimidazoline) adipate is specially preferred.

The antistatic compounds of the invention are generally employed in a concentration of from about 1% to about 10% by weight, based upon the weight of iron oxide in the coating. A valuable concentration is about 5% by weight.

While the magnetic tapes discussed herein include those used for sound recording, for use in computers, and for video tape, nevertheless it is not the intention to limit the scope of this invention solely to these uses. The invention is applicable to any magnetic tape which is susceptible to build up of static electrical charge. With the antistatic agents of the invention it is possible to prepare a magnetic tape with excellent antistatic properties, which are extremely valuable wherever magnetic tape is used in a situation tending to cause the build-up of such charges. Static electricity causes the tape to adhere to the guide posts of computer or recording devices and also interferes with the magnetic and electrical properties of the tape, itself. These and other difficulties are overcome according to the methods of the invention.

The antistatic compounds of the invention may be used for the production of tape having magnetic properties by means of a coating which comprises magnetic material such as iron oxide, solvents, inert filler and binder ingredients, such as calcium carbonate, barium sulphate, talc, diatomaceous earth, kaolin and the like, as well as other conventional materials.

In the following example, parts are by weight unless otherwise specified and it is not the intention to limit the scope of the invention to said example which is set forth merely for illustrative purposes.

EXAMPLE

A coating formulation for magnetic tape is prepared by first mixing together the following ingredients:

| | Parts |
|---|---|
| IRN–110 (C. K. Williams) | 800 |
| Vinylite VAGH (Bakelite) | 120 |
| Paraplex G–50 (Rohm & Haas) | 32 |
| Neolyn 23 (Hercules Powder) | 32 |
| Tenlo–7 (Nopco Chemical Co.) | 16 |
| R–12 silicone, 10% solution (Union Carbide) | 10 |
| Methyl ethyl ketone | 325 |
| Methyl isobutyl ketone | 325 |
| | 1660 |

The above formulation is ground in a ball mill (1 gal. size) using ½" diameter steel balls for a period of 48 hours. Then there is added a reduction mixture composed of 115 parts of methyl ethyl ketone and 115 parts of methyl isopropyl ketone. Grinding is continued for an additional hour, whereupon the mixture is drained from the ball mill, and filtered through a 10 micron filter. The so-obtained coating liquid is employed to place a 0.4 mil coating upon a Mylar terephthalic anhydride glycol derivative plastic ribbon of about 2 mil thickness. The plastic ribbon having the coating thereon is passed through an oven at 300° F. for one minute, whereupon the solvent is evaporated. This film coated with magnetic material not having antistatic agents therein manifests very poor antistatic properties. A similar formulation is prepared except that 4 parts of di(1-β-hydroxyethyl-2-undecylimidazoline) adipate is blended into the formulation. The magnetic film produced with the aforesaid antistatic agent exhibits excellent antistatic properties.

The following antistatic agents are also useful in reducing static charge in magnetic tape: di(1-β-hydroxyethyl-2-undecylimidazoline) sebacate, di(1-β-hydroxyethyl-2-undecylimidazoline) isophthalate, di(1-β-hydroxyethyl-2-undecylimidazoline) tartrate, di(1-β-hydroxyethyl-2-undecylimidazoline) mercaptosuccinate.

Instead of, or in addition to, incorporating the antistatic agent in the coating material to be placed on the plastic backing, it is also useful to incorporate the antistatic agent into the plastic backing itself. This is done in conventional ways and the same total concentration of antistatic agent is usefully employed.

What is claimed is:

1. In a magnetic tape with enhanced antistatic characteristics, the improvement comprising a tape formed of a non-magnetic base and a coating thereon of a binder containing magnetizable iron oxide particles, together with from about 1% to about 10% by weight, based on the weight of iron oxide, of an antistatic compound comprising a salt of a member selected from the group consisting of (i) the imidazoline compound of the formula:

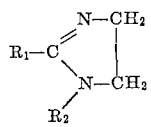

wherein $R_1$ is a member selected from the group consisting of alkyl having 7 to 17 carbon atoms, and alkenyl having 7 to 17 carbon atoms; and $R_2$ is hydroxy(lower)alkyl, and (ii) an acid selected from the group consisting of dibasic organic acids and hydroxy organic acids having at least one free carboxylic acid group.

2. Magnetic tape according to claim 1, in which the antistatic agent is di(1-β-hydroxyethyl-2-undecylimidazoline) adipate.

3. Magnetic tape according to claim 1, in which the antistatic agent is di(1-β-hydroxyethyl-2-undecylimidazoline) sebacate.

4. Magnetic tape according to claim 1, in which the antistatic agent is (di(1-β-hydroxyethyl-2-undecylimidazoline) isophthalate.

5. Magnetic tape according to claim 1, in which the antistatic agent is (di(1-β-hydroxyethyl-2-undecylimidazoline) tartrate.

6. Magnetic tape according to claim 1, in which the antistatic agent is (di(1-β-hydroxyethyl-2-undecylimidazoline) mercaptosuccinate.

7. In magnetic tape having a non-magnetic base and a coating of a binder containing magnetizable iron oxide particles, the improvement consisting of the presence in said coating of from about 1% to about 10% by weight, based on the weight of iron oxide, of a di-[1-(β-hydroxyethyl)-2-undecylimidazoline] salt of an acid selected from the group consisting of adipic acid, sebacic acid, isophthalic acid, tartaric acid and mercaptosuccinic acid.

References Cited by the Examiner

UNITED STATES PATENTS

| | | | |
|---|---|---|---|
| 2,355,837 | 8/44 | Wilson | 252—8.8 |
| 2,730,464 | 1/56 | Winsor | 252—8.8 |
| 2,778,748 | 1/57 | Rowe et al. | 252—8.8 |
| 2,957,003 | 10/60 | Johnson | 252—8.8 |
| 2,982,651 | 5/61 | Mackey | 252—8.8 |
| 2,987,514 | 6/61 | Hughes et al. | 252—8.8 |
| 2,987,521 | 6/61 | Hughes et al. | 252—8.8 |
| 2,987,522 | 6/61 | Shen | 252—8.8 |
| 2,995,520 | 8/61 | Luvisi et al. | 252—8.8 |
| 3,020,276 | 2/62 | Hughes et al. | 252—8.8 |
| 3,024,236 | 3/62 | Hughes | 252—8.8 |

FOREIGN PATENTS

| | | |
|---|---|---|
| 524,847 | 8/40 | Great Britain. |
| 868,346 | 5/61 | Great Britain. |

WILLIAM D. MARTIN, *Primary Examiner.*

RICHARD D. NEVIUS, MURRAY KATZ, *Examiners.*